(12) United States Patent
Chan et al.

(10) Patent No.: US 11,330,422 B2
(45) Date of Patent: May 10, 2022

(54) MOBILE COMMUNICATION DEVICES AND METHODS FOR MANAGING CONNECTIONS ASSOCIATED WITH MULTIPLE SUBSCRIBER NUMBERS

(71) Applicant: Wistron Corp., New Taipei (TW)

(72) Inventors: Yu Chun Chan, New Taipei (TW); Shih Jui Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/081,033

(22) Filed: Oct. 27, 2020

(65) Prior Publication Data

US 2022/0070654 A1 Mar. 3, 2022

(30) Foreign Application Priority Data

Aug. 25, 2020 (TW) .................................. 109128856

(51) Int. Cl.
| | |
|---|---|
| *H04W 8/18* | (2009.01) |
| *H04W 48/16* | (2009.01) |
| *H04W 8/20* | (2009.01) |
| *H04W 36/26* | (2009.01) |
| *H04W 76/15* | (2018.01) |
| *H04W 76/11* | (2018.01) |

(52) U.S. Cl.
CPC ............ *H04W 8/183* (2013.01); *H04W 8/20* (2013.01); *H04W 36/26* (2013.01); *H04W 76/11* (2018.02); *H04W 76/15* (2018.02)

(58) Field of Classification Search
None
See application file for complete search history.

(56) References Cited

U.S. PATENT DOCUMENTS

| | | | |
|---|---|---|---|
| 10,623,943 B1* | 4/2020 | Sevindik ............... | H04W 16/14 |
| 10,625,943 B2 | 4/2020 | Volkan et al. | |
| 2021/0314820 A1* | 10/2021 | Schliwa-Bertling .... | H04L 47/74 |

OTHER PUBLICATIONS

Chinese Language Office Action dated Jun. 16, 2021 in corresponding Taiwan application 109128856.

(Continued)

*Primary Examiner* — Gary Lafontant
(74) *Attorney, Agent, or Firm* — McClure, Qualey & Rodack, LLP

(57) ABSTRACT

A method for managing connections associated with multiple subscriber numbers is provided. The method includes the following steps: using a first subscriber number and a second subscriber number to establish two data connections with two mobile communication networks; receiving a QoS update notification from one of the wireless transceivers in response to the first data connection being used for data transfer of an application; and enabling the data transfer of the application to switch from the first data connection to the second data connection in response to the QoS update notification indicating that the QoS of the first data connection fails to support the application and the QoS of the second data connection is capable of supporting the application. Advantageously, the performance requirement of the application may be maintained after switching to the second data connection, thereby ensuring smooth operation of the application.

12 Claims, 8 Drawing Sheets

(56) References Cited

OTHER PUBLICATIONS

"GPP TS 23.501: 3rd Generation Partnership Project; Technical Specification Group Services and System Aspects; System architecture for the 5G System (5GS); Stage 2 (Release 16);" Sep. 2020; pp. 1-447.
"3GPP TS 38.300; 3rd Generation Partnership Project; Technical Specification Group Radio Access Network; NR; NR and NG-RAN Overall Description; Stage 2 (Release 16);" Sep. 2020; pp. 1-148.
"ITU-T Y.3104—Series Y: Global Information Infrastructure, Internet Protocol Aspects, Next-Generation Networks, Internet of Things and Smart Cities Arichitecture of the IMT-2020 network;" Dec. 2018; pp. 1-38.
"ITU-T Y.3112—Series Y: Global Information Infrastructure, Internet Protocol Aspects, Next-Generation Networks, Internet of Things and Smart Cities Framework for the support of network slicing in the IMT-2020 network;" Dec. 2018; pp. 1-20.

\* cited by examiner

MOBILE COMMUNICATION DEVICES AND METHODS FOR MANAGING CONNECTIONS ASSOCIATED WITH MULTIPLE SUBSCRIBER NUMBERS

CROSS REFERENCE TO RELATED APPLICATIONS

This Application claims priority of Taiwan Patent Application No. 109128856, filed on Aug. 25, 2020, the entirety of which is incorporated by reference herein.

BACKGROUND OF THE APPLICATION

Field of the Application

The application generally relates to mobile communications, and more particularly, to mobile communication devices and methods for managing connections associated with multiple subscriber numbers.

Description of the Related Art

With the growing demand for ubiquitous computing and networking, various mobile communication technologies have been developed, including Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, and Time-Division LTE (TD-LTE) technology, etc. In particular, GSM/GPRS/EDGE technology is also called 2G mobile communication technology; WCDMA/CDMA-2000/TD-SCDMA technology is also called 3G mobile communication technology; and LTE/LTE-A/TD-LTE technology is also called 4G mobile communication technology.

Generally, a mobile communication device (e.g., a cellular phone) uses only one subscriber identity card to connect to a particular mobile communication network for obtain mobile services anytime and anywhere. However, to an increasing extent, more and more people find that having an additional subscriber identity card is a good way to reduce their mobile service charges (including voice and/or data services), or to separate personal and business phone calls. In order to meet this market demand, so-called multi-card cellular phones have been developed, which realize smoother data connectivity and improve user experiences by allowing mobile services to switch from using one subscriber identity card to another when the currently used subscriber identity card has bad network reception.

However, if a multi-card cellular phone is used in the next generation (i.e., 5G) mobile communication network, the switching of data connection between the subscriber identity cards may not work successfully. In a 5G mobile communication network, separate network slices are allocated based on three service types, including enhanced Mobile Broadband (eMBB), ultra-Reliable Low-Latency Communication (uRLLC), and massive Machine Type Communications (mMTC). Each type of these network slices correspond to different Quality of Service (QoS) levels.

FIG. 1 is a schematic diagram illustrating the allocation of separate network slices for different service types. As shown in FIG. 1, applications such as video streaming, and Virtual Reality (VR) on smartphones generally require high bandwidth and correspondingly, an eMBB network slice may be allocated for such applications. Applications such as temperature sensing, often used in the agriculture and logistics industries, generally involve a large number of sensors, and correspondingly, an mMTC network slice may be allocated for such applications. Applications such as autopilot generally require high reliability and low latency, and correspondingly, a URLLC network slice may be allocated for such applications.

For example, if an ongoing application executed on a multi-card cellular phone needs to switch from the 5G connection associated with subscriber identity card 1 to the 5G connection associated with subscriber identity card 2, the conventional design would only take the signal strengths of these two connections into account. However, there may be situations where the 5G connection associated with subscriber identity card 2 may not satisfy the performance requirement of the ongoing application, even though the 5G connection associated with subscriber identity card 2 has a better signal strength. As a result, the switch of connections between the subscriber identity cards may cause the application choppy/stuttering or even freeze, which will seriously affect user experience.

Therefore, it is desirable to have a more efficient and robust way of managing connections associated with multiple subscriber identity cards.

BRIEF SUMMARY OF THE APPLICATION

In one aspect of the application, a mobile communication device comprising one or more wireless transceivers and a controller is provided. The wireless transceivers are configured to perform wireless transmission and reception using a mobile communication technology. The controller is configured to perform multi-number connection management, wherein the multi-number connection management comprises: using a first subscriber number and a second subscriber number to establish a first data connection with a first mobile communication network and a second data connection with a second mobile communication network, respectively, via the wireless transceiver; receiving a Quality of Service (QoS) update notification from one of the wireless transceivers when the first data connection is used for data transfer of an application; and enabling the data transfer of the application to switch from the first data connection to the second data connection in response to the QoS update notification indicating that a QoS of the first data connection fails to support the application and a QoS of the second data connection is capable of supporting the application.

In a first implementation form of the first aspect, the QoS update notification comprises at least one of the following: a 5G QoS Identifier (5QI) of the first data connection; a Packet Delay Budget (PDB) of the first data connection; a Packet Error Rate (PER) of the first data connection; and a Guaranteed Flow Bit Rate (GFBR) of the first data connection.

In a second implementation form of the first aspect in combination with the first implementation form of the first aspect, the multi-number connection management further comprises: determining that the QoS of the first data connection fails to support the application in response to a service type of the application being associated with Ultra-Reliable Low-Latency Communication (URLLC) and at least one of the 5QI, the PDB, and the PER of the first data connection failing to satisfy a performance requirement corresponding to the service type of the application; and determining that the QoS of the first data connection fails to support the application in response to the service type of the application being associated with enhanced Mobile Broadband (eMBB) and at least one of the 5QI, the PDB, and the GFBR of the first data connection failing to satisfy the performance requirement corresponding to the service type of the application.

In a third implementation form of the first aspect, the multi-number connection management further comprises: determining that the QoS of the second data connection is capable of supporting the application in response to a service type of the application being associated with URLLC and at least one of a 5QI, a PDB, and a PER of the second data connection satisfying a performance requirement corresponding to the service type of the application; and determining that the QoS of the second data connection is capable of supporting the application in response to the service type of the application being associated with eMBB and at least one of the 5QI, the PDB, and a GFBR of the second data connection satisfying the performance requirement corresponding to the service type of the application.

In a fourth implementation form of the first aspect, the multi-number connection management further comprises: notifying the application of that the QoS of the first data connection fails to support the application and the QoS of the second data connection is capable of supporting the application, so as to enable the application to switch the data transfer from the first data connection to the second data connection; and setting the first subscriber number to an idle state and the second subscriber number to an active state in response to the application switching the data transfer from the first data connection to the second data connection.

In a fifth implementation form of the first aspect, the multi-number connection management is executed in an application framework layer, and the application is executed in an application layer on top of the application framework layer.

In a second aspect of the application, a method for managing connections associated with multiple subscriber numbers, executed by a mobile communication device comprising one or more wireless transceivers, is provided. The method comprises the following steps: using a first subscriber number and a second subscriber number to establish a first data connection with a first mobile communication network and a second data connection with a second mobile communication network, respectively; receiving a QoS update notification from one of the wireless transceivers when the first data connection is used for data transfer of an application; and enabling the data transfer of the application to switch from the first data connection to the second data connection in response to the QoS update notification indicating that a QoS of the first data connection fails to support the application and a QoS of the second data connection is capable of supporting the application.

Other aspects and features of the present application will become apparent to those with ordinarily skill in the art upon review of the following descriptions of specific embodiments of the mobile communication devices and the methods for managing connections associated with multiple subscriber numbers.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
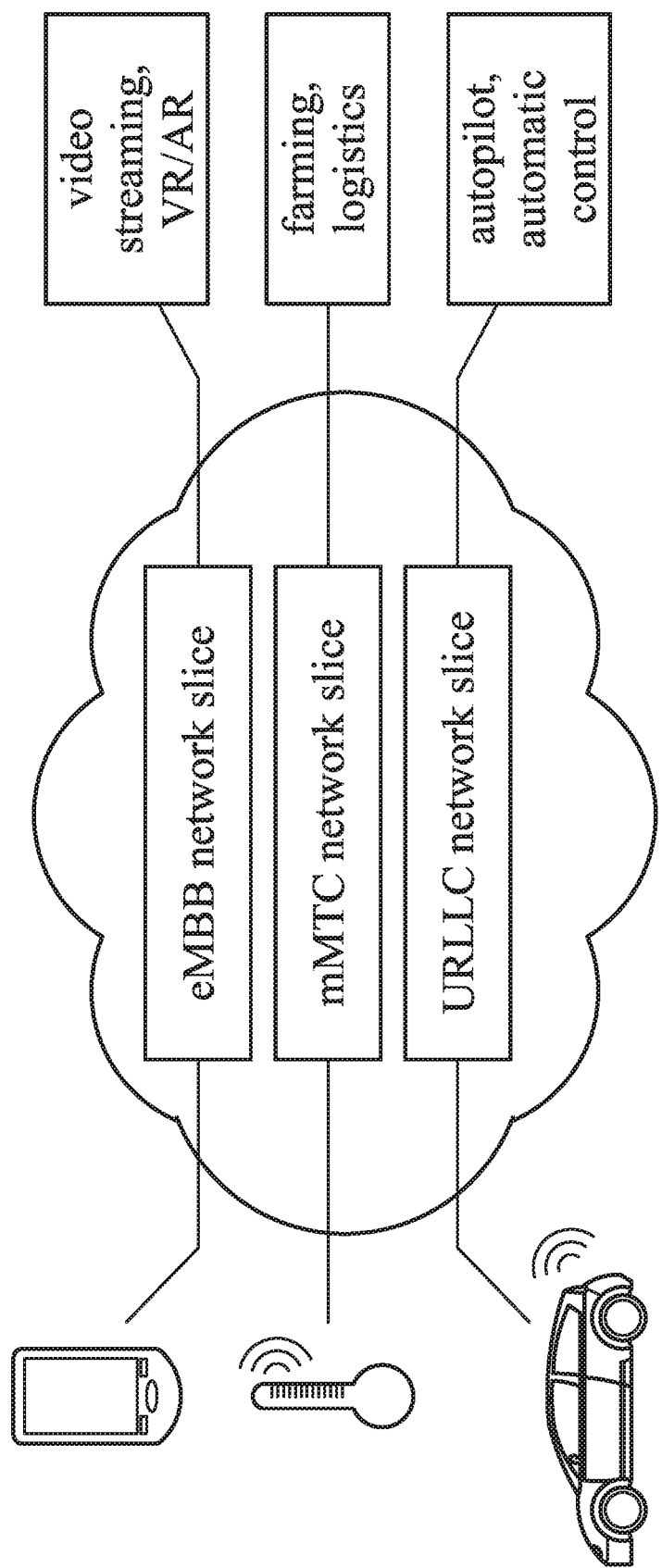
FIG. 1 is a schematic diagram illustrating the allocation of separate network slices for different service types.
Figure 2:
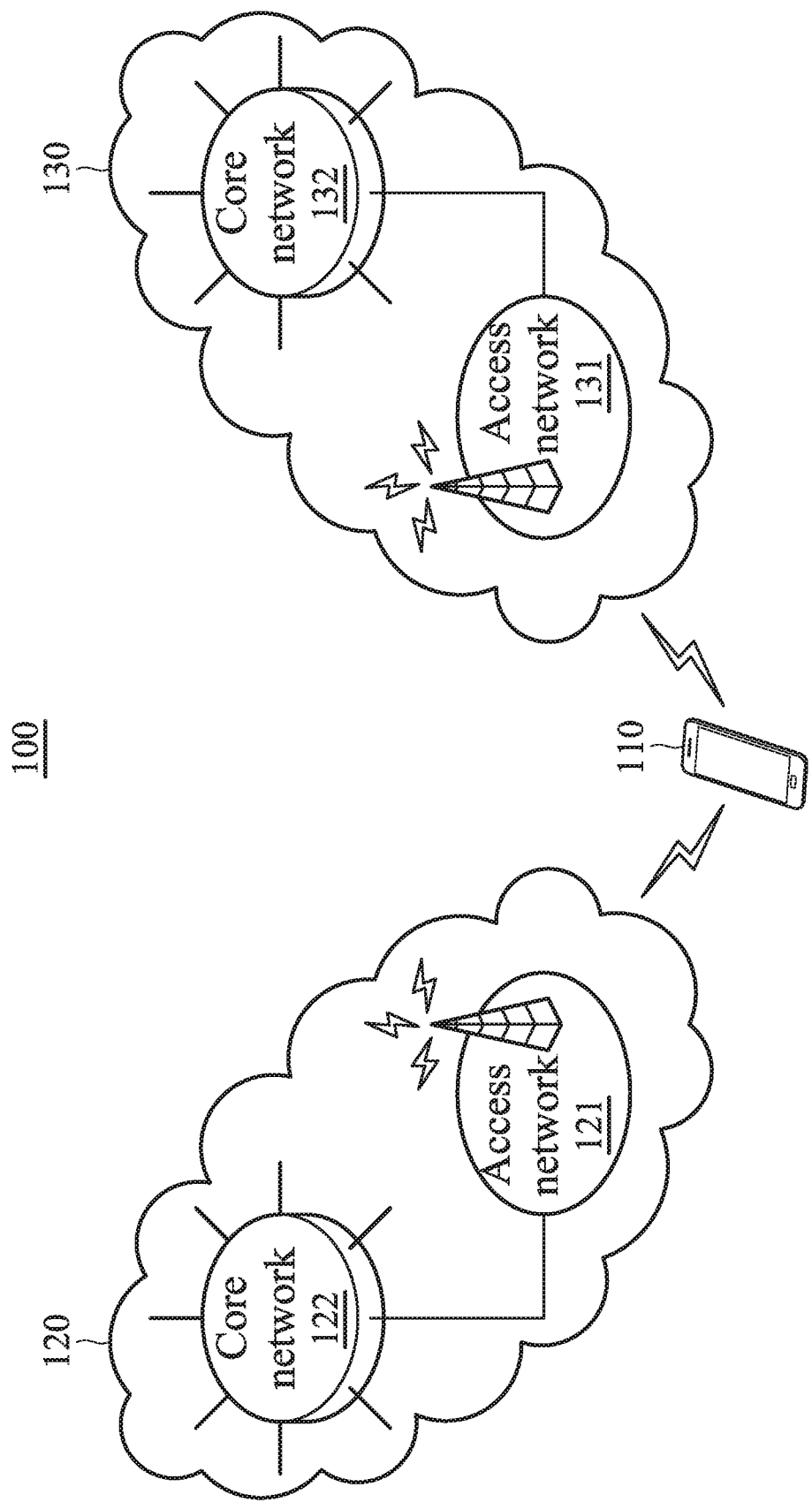
FIG. 2 is a block diagram of a wireless communication environment according to an embodiment of the application.

FIG. 2 is a block diagram of a wireless communication environment according to an embodiment of the application.

As shown in FIG. 2, the wireless communication environment 100 includes a mobile communication device 110, and two mobile communication networks 120~130. The mobile communication networks 120~130 may use the same or different mobile communication technologies, as long as the mobile communication technologies support network slicing (such as 5G, 6G, or any future evolution of 5G/6G). The mobile communication device 110 may selectively and wirelessly connect to one or both of the mobile communication networks 120~130 to obtain mobile services, including eMBB, URLLC, and/or mMTC services.

The mobile communication device 110 may be a smartphone, a wearable electronic apparatus, a panel Personal Computer (PC), a laptop computer, or any computing device supporting the mobile communication technology utilized by the mobile communication networks 120~130.

The mobile communication network 120 may include an access network 121 and a core network 122, while the mobile communication network 130 may include an access network 131 and a core network 132. Each of the access networks 121 and 131 is responsible for processing radio signals, terminating radio protocols, and connecting the mobile communication device 110 with the core networks 122 and 132, respectively. Each of the core networks 122 and 132 is responsible for performing mobility management, network-side authentication, and interfaces with public/external networks (e.g., the Internet). The access networks 121 and 131, and the core networks 122 and 132 may each include one or more network nodes for carrying out said functions.

In one embodiment, the mobile communication network 120/130 may be a 5G (e.g., New Radio (NR)) network, and the access network 121/131 and the core network 122/132 may be a Next Generation-Radio Access Network (NG-RAN) and a Next Generation-Core Network (NG-CN), respectively.

An NG-RAN may include one or more base stations, such as next generation NodeBs (gNBs). Each gNB may support wireless transmission and reception on high frequency bands (e.g., above 24 GHz), and each gNB may further include one or more Transmission Reception Points (TRPs). Each gNB and TRP may be referred to as a 5G base station.

Each 5G base station may form one or more cells to provide wireless accesses to the mobile communication device 110. For example, the mobile communication device 110 may camp on one or more cells, wherein the camped cells may be referred to as serving cells.

An NG-CN may include various network functions. In the network slicing technology, these network functions may be divided into UE-level network functions and service-level network functions. The UE-level network functions may include registration management, signaling connection management, mobility management, and access authentication and authorization, etc., while the service-level network functions may include session management, and path selection and management, etc.

Taking a 5G network as an example, the UE-level network functions at least include the Network Access Control Function (NACF). Logically, an NACF instance may simultaneously exist in multiple network slice instances to provide the functions of registration management and mobility management to all service sessions of a UE. On the other hand, the service-level network functions at least include the Session Management Function (SMF). Logically, there may be a respective SMF instance in each network slice instance, and each SMF instance provides the functions of session management and path selection and management for a respective service session.

For example, the mobile communication device 110 may establish a data connection (e.g., a Packet Data Network (PDN) connection) to the mobile communication network 120/130 in response to an application being activated, and start a service session (e.g., a Protocol Data Unit (PDU) session) over the data connection. Each service session is served by a respective network slice instance, and each network slice instance includes all network functions necessary to meet the requirement of the service session.

In addition, an NG-CN may include other network functions, such as Network Function Repository (NFR), and Network Slice Selection Function (NSSF), etc.

The NFR is responsible for maintaining and providing the deployed NF instances information when deploying, updating or removing NF instances, and supporting the service discovery function. Each NF instance registers with the NFR upon instantiation, and keeps updating its status (e.g., activated or deactivated) to the NFR, thereby allowing the NFR to be updated of the available NF instances in the 5G core network.

The NSSF is responsible for assisting with the selection of the Network Slice Instances (NSI) that will serve the mobile communication device 110. When the mobile communication device 110 registers with the mobile communication network 120/130, the NACF may send information regarding the preference of NSI selection of the mobile communication device 110 to the NSSF, and the NSSF may provide a list of suitable NSIs to the NACF.

Figure 3:
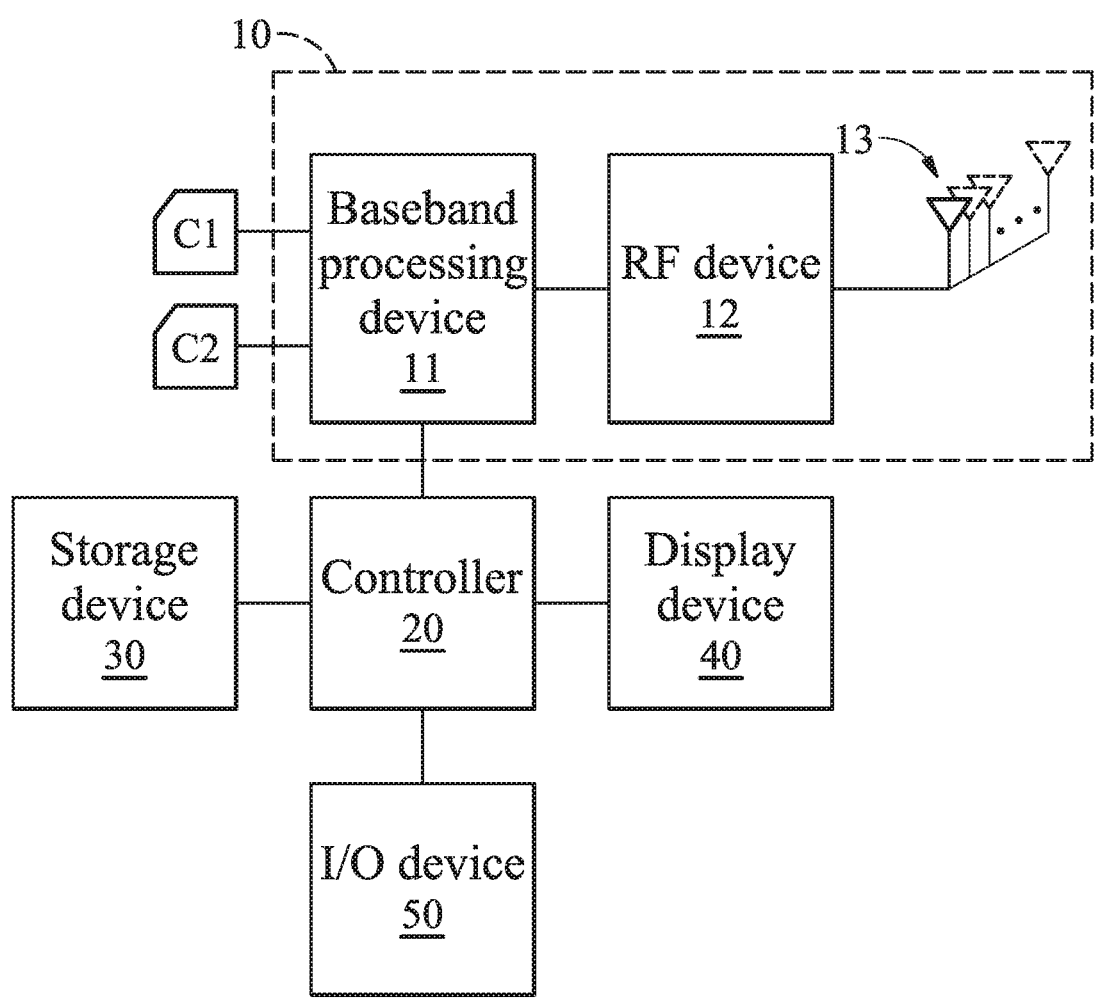
FIG. 3 is a block diagram illustrating an exemplary hardware architecture of the mobile communication device 110 according to an embodiment of the application.

FIG. 3 is a block diagram illustrating an exemplary hardware architecture of the mobile communication device 110 according to an embodiment of the application.

As shown in FIG. 3, the mobile communication device 110 may include a wireless transceiver 10, a controller 20, a storage device 30, a display device 40, and an Input/Output (I/O) device 50.

The wireless transceiver 10 is configured to perform wireless transmission and reception to and from the mobile communication networks 120/130 using a mobile communication technology (e.g., the 5G NR technology).

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity cards (denoted as C1 and C2) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technology, wherein the radio frequency may be 24 GHz~300 GHz utilized in 5G (e.g., NR) systems, or another radio frequency, depending on the mobile communication technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the mobile communication networks 120~130, storing and retrieving data (e.g., program code of a connection management program) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for managing connections associated with multiple subscriber numbers.

To further clarify, the wireless communications between the mobile communication device 110 and the mobile communication networks 120~130 are carried out using different subscriber numbers. Each subscriber number may be provided by a respective subscriber identity card (denoted as C1/C2 in FIG. 2). For example, if the mobile communication network 120/130 is a 5G network, then the subscriber identity card C1/C2 may be a Universal Subscriber Identity Module (USIM) card. In another embodiment, each subscriber number may be provided by a virtual subscriber identity card or an embedded USIM (eUSIM), and the present application is not limited thereto.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, Operating Systems (OS), and/or the method for managing connections associated with multiple subscriber numbers.

The display device 40 may be a Liquid-Crystal Display (LCD), a Light-Emitting Diode (LED) display, an Organic LED (OLED) display, or an Electronic Paper Display (EPD), etc., for providing a display function.

In another embodiment, the display device 40 may further include one or more touch sensors disposed thereon or thereunder for sensing touches, contacts, or approximations of objects (e.g., fingers or styluses), thereby enabling the display device 40 to be a touch-sensitive display device.

The I/O device 50 may include one or more buttons, a keyboard, a mouse, a touch pad, a video camera, a microphone, a speaker, and/or sensors (e.g., a barometric/temperature sensor, a humidity sensor, and/or a blood-pressure/heart-rate/body-temperature sensor), etc., to serve as the Man-Machine Interface (MMI) for interaction with users.

It should be understood that the components described in the embodiment of FIG. 3 are for illustrative purposes only and are not intended to limit the scope of the application. For example, the mobile communication device 110 may include more subscriber identity cards or more components, such as a Global Positioning System (GPS) device for use of some location-based services or applications, and/or a battery for powering the other components of the mobile communication device 110, etc. Alternatively, the mobile communication device 110 may include fewer components. For example, the mobile communication device 110 may not include the display device 40 and/or the I/O device 50.

Figure 4:
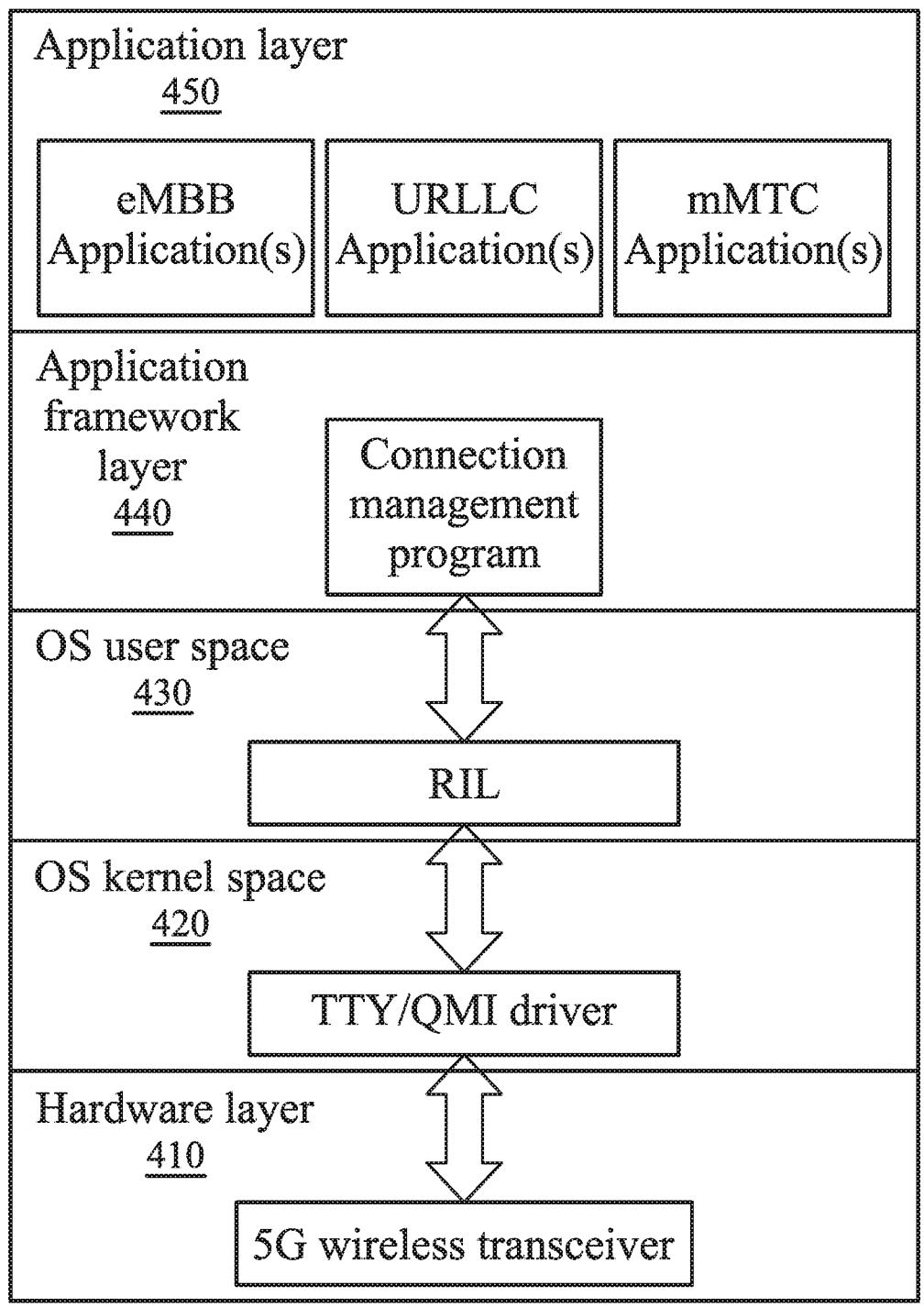
FIG. 4 is a block diagram illustrating an exemplary software architecture of the mobile communication device 110 according to an embodiment of the application.

FIG. 4 is a block diagram illustrating an exemplary software architecture of the mobile communication device 110 according to an embodiment of the application.

As shown in FIG. 4, the software architecture may include a hardware layer 410, an OS (e.g., Linux) kernel space 420, an OS user space 430, an application framework layer 440, and an application layer 450.

The hardware layer 410 may include at least a 5G wireless transceiver (e.g., the wireless transceiver 10) to provide 5G mobile services. The hardware layer 410 may communicate with the applications in the application layer 450 via the TTY/QMI drivers in the OS kernel space 420. Please note that the 5G wireless transceiver in the present application is not only capable of providing standard 5G signaling, but also capable of providing control signaling regarding connection management, such as providing a notification of the QoS of the data connection associated with each subscriber number.

In one embodiment, the 5G wireless transceiver may be configured to send the notification only when the QoS of the data connection associated with each subscriber number changes. In other words, the notification may be referred to as a QoS update notification.

The OS kernel space 420 may include the serial interface TTY for AT command, and/or the Qualcomm chip driver QMI (Qualcomm Message Interface).

The OS user space 430 may include a Radio Interface Layer (RIL) serving as the abstraction layer between the 5G wireless transceiver and the applications in the application layer 450.

The application layer 450 may include various applications, such as eMBB applications (e.g., video streaming, virtual reality, or augmented reality), URLLC applications (e.g., autopilot, automatic control, or remote surgery), and/or mMTC applications (e.g., agricultural sensors, or reservoir water sensors).

The application framework layer 440 may include a connection management program executed to perform the method for managing connections associated with multiple subscriber numbers. In particular, the connection management program is executed to receive QoS update notifications of the data connections associated with multiple subscriber numbers and keep monitoring the QoS of the data connections, thereby realizing the connection management referred to herein.

Figure 5A:
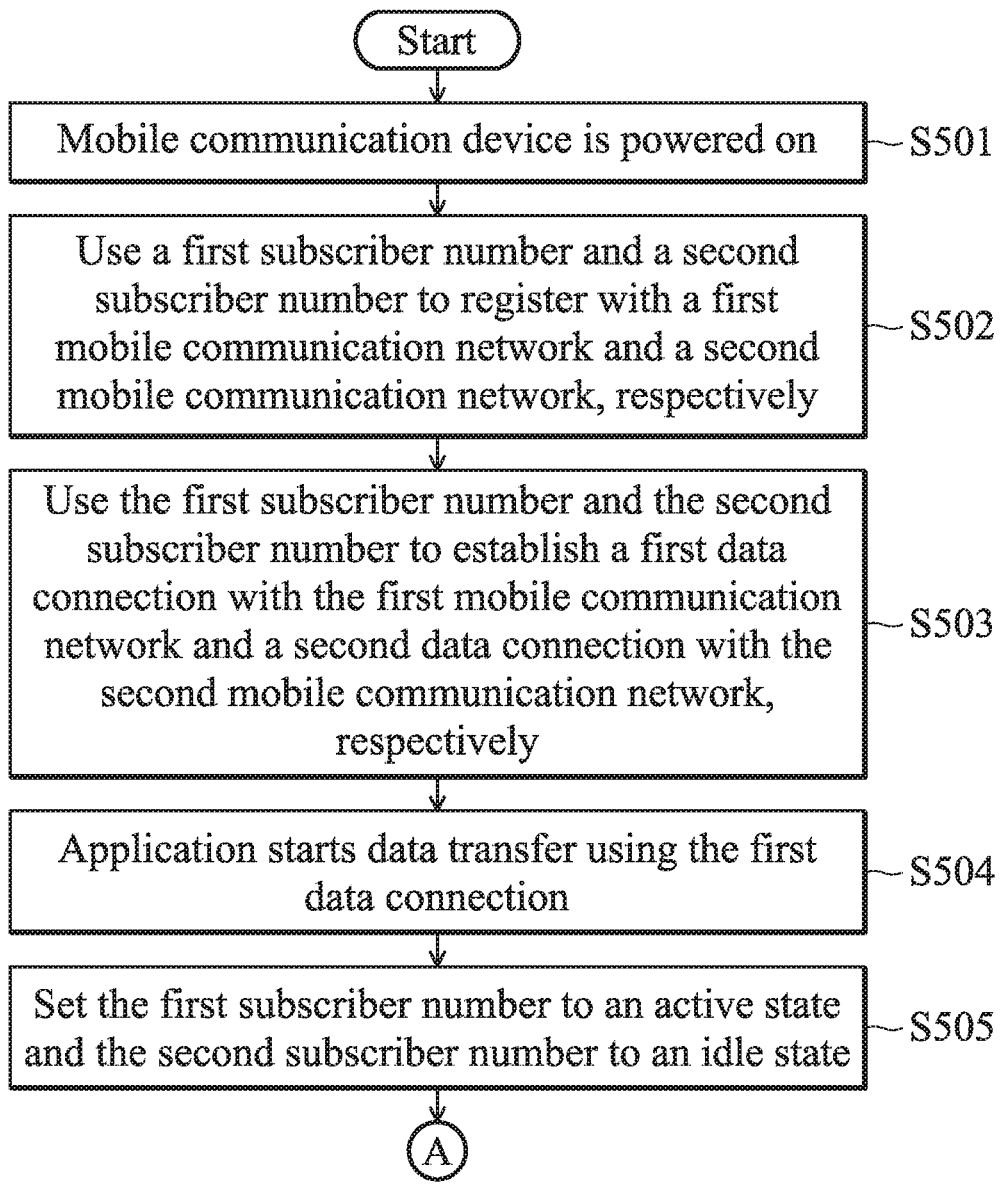
FIGS. 5A and 5B show a flow chart illustrating the method for managing connections associated with multiple subscriber numbers according to an embodiment of the application.
Figure 5B:
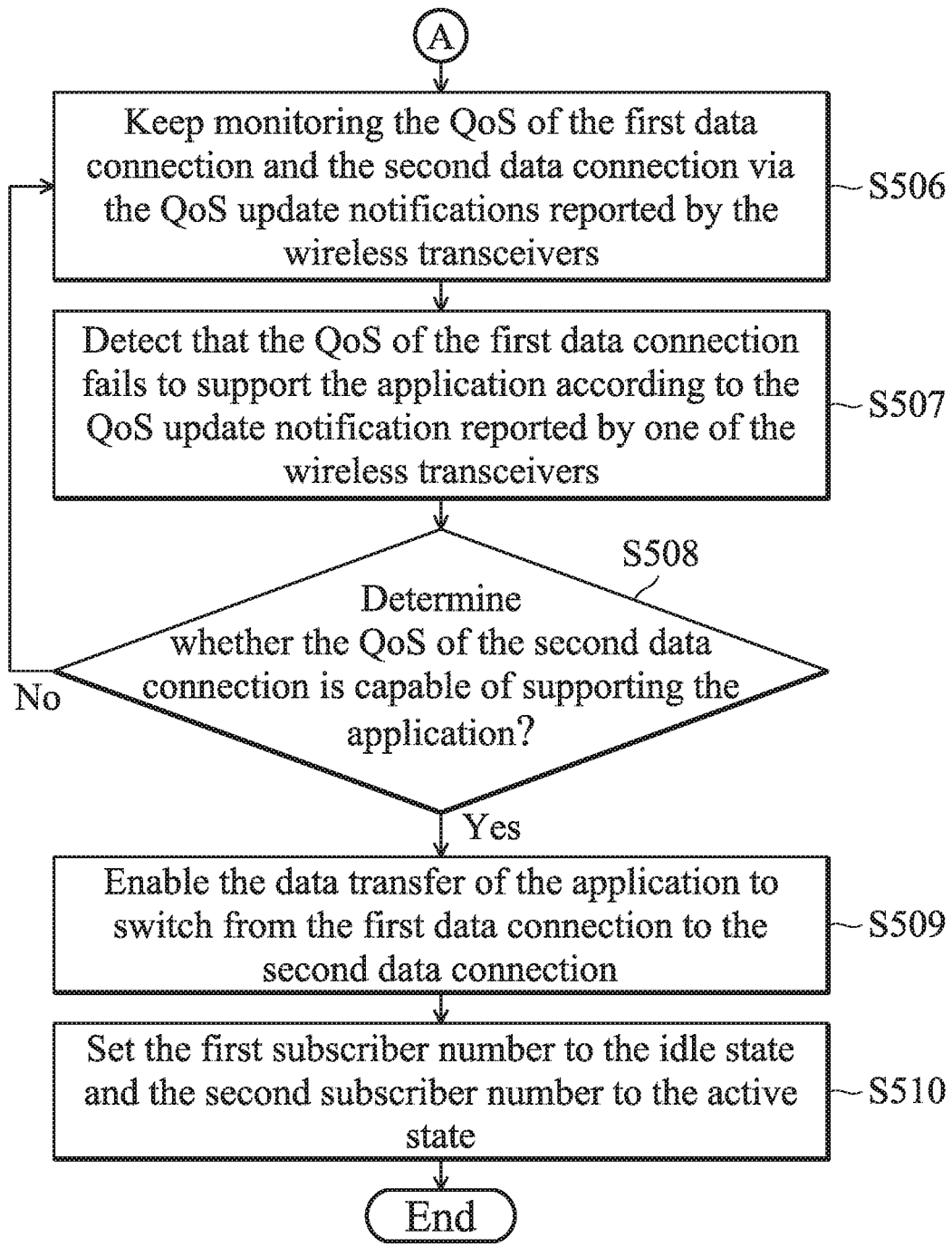

FIGS. 5A and 5B show a flow chart illustrating the method for managing connections associated with multiple subscriber numbers according to an embodiment of the application.

In this embodiment, the method may be applied to and executed by a mobile communication device (e.g., the mobile communication device 110) which includes at least one or more wireless transceivers (e.g., the wireless transceiver 10) and supports the use of two or more subscriber numbers for wireless communications with two mobile communication networks simultaneously.

To begin with, in step S501, the mobile communication device 110 is powered on.

Next, in step S502, the mobile communication device 110 uses a first subscriber number and a second subscriber number to register with a first mobile communication network and a second mobile communication network, respectively.

In step S503, the connection management program in the mobile communication device 110 uses the first subscriber number and the second subscriber number to establish a first data connection with the first mobile communication network and a second data connection with the second mobile communication network, respectively.

In step S504, an application in the mobile communication device 110 starts data transfer using the first data connection.

In step S505, the connection management program in the mobile communication device 110 sets the first subscriber number to an active state and the second subscriber number to an idle state.

In step S506, the connection management program in the mobile communication device 110 keeps monitoring the QoS of the first data connection and the second data connection via the QoS update notifications reported by the wireless transceivers.

In step S507, the connection management program in the mobile communication device 110 detects that the QoS of the first data connection fails to support the application according to the QoS update notification reported by one of the wireless transceivers.

In step S508, the connection management program in the mobile communication device 110 determines whether the QoS of the second data connection is capable of supporting the application.

Figure 6:
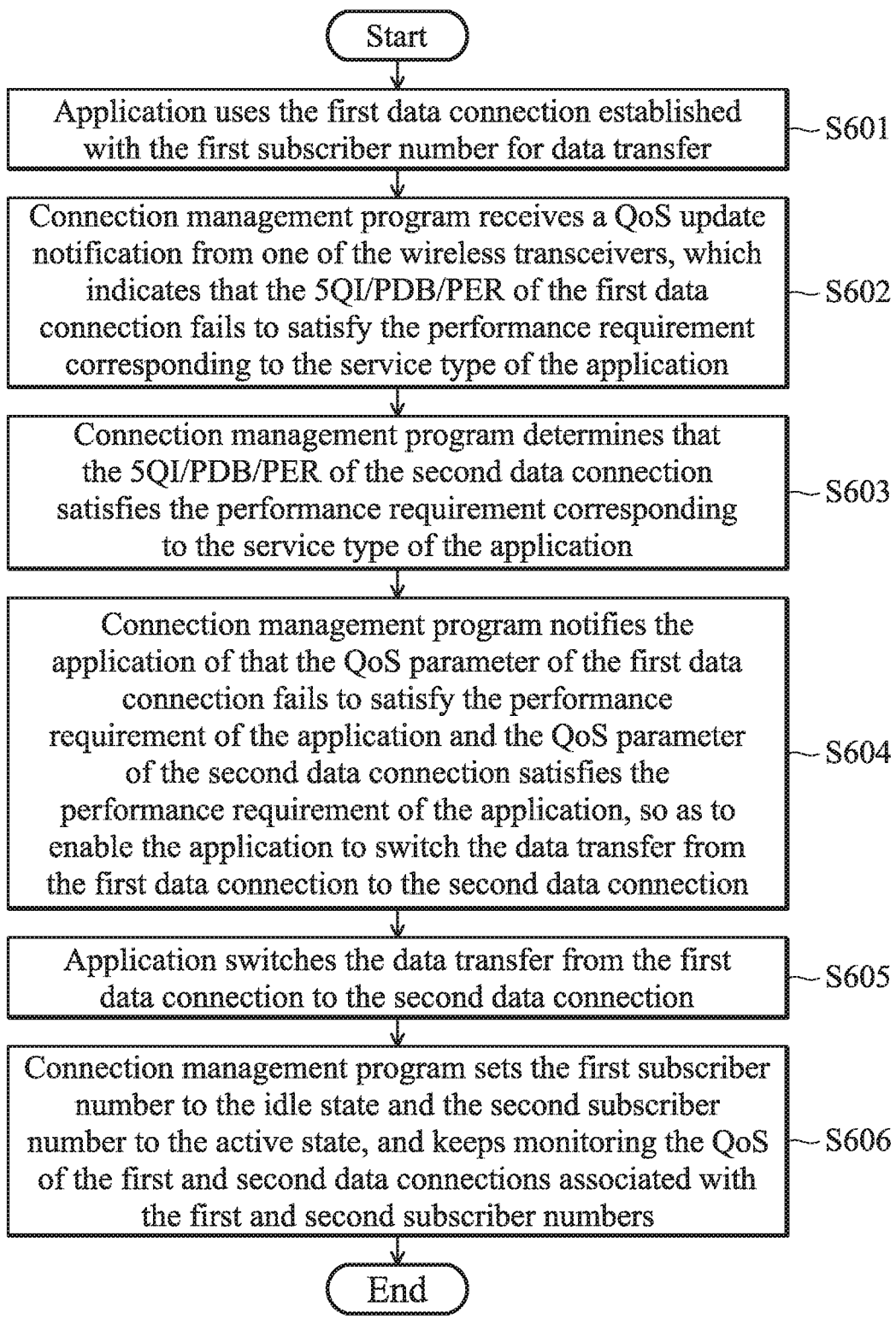
FIG. 6 is a flow chart illustrating the switching of data connections used for the data transfer of a delay-critical application according to an embodiment of the application.
Figure 7:
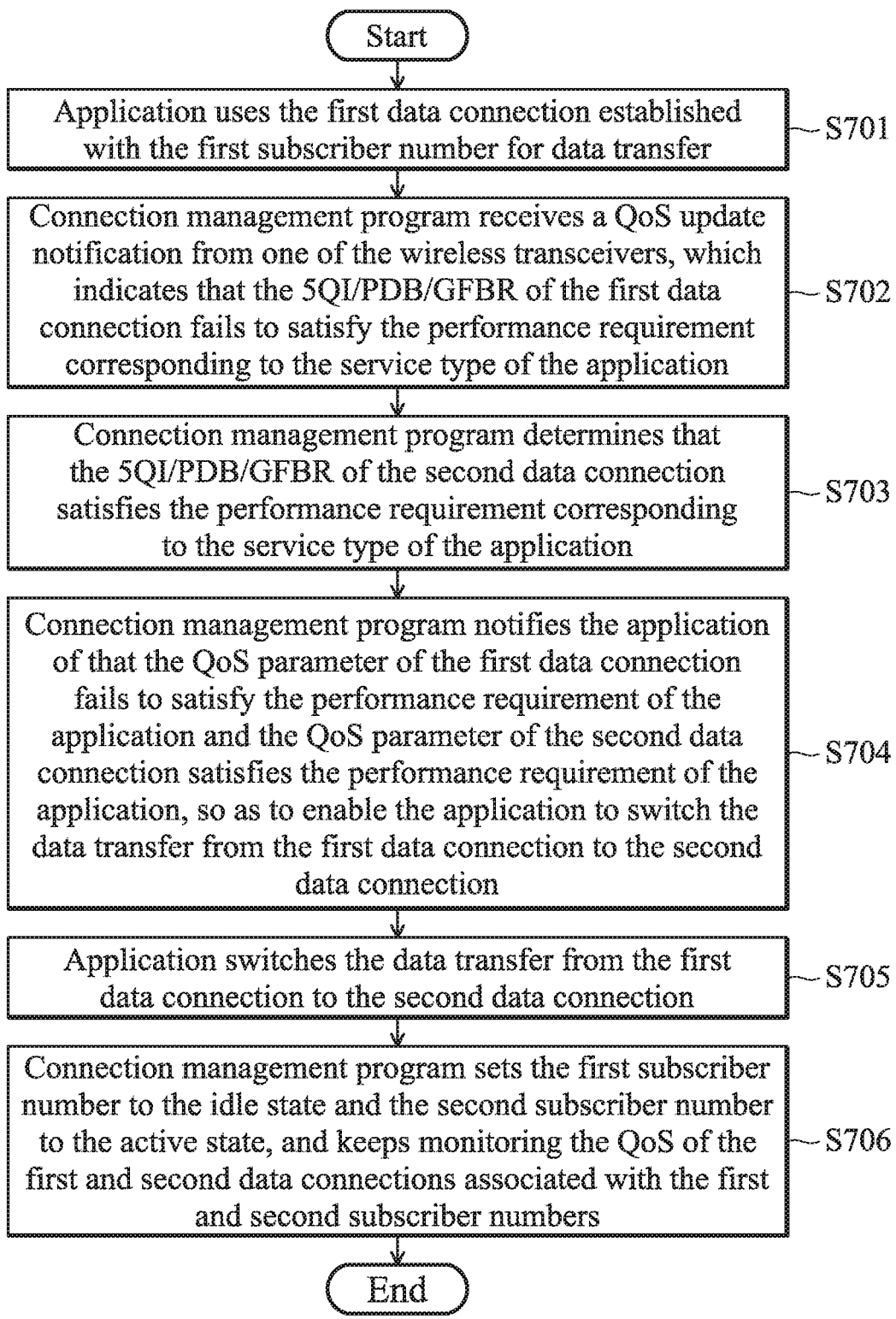
FIG. 7 is a flow chart illustrating the switching of data connections used for the data transfer of a GFBR application according to an embodiment of the application.

Details regarding the determination of whether the QoS of a data connection is capable of supporting an application will be clarified in FIGS. 6~7 latter.

Subsequent to step S508, if the QoS of the second data connection is not capable of supporting the application, the method returns to step S506 to keep monitoring the QoS of the first data connection and the second data connection.

Subsequent to step S508, if the QoS of the second data connection is capable of supporting the application, the method proceeds to step S509, in which the connection management program in the mobile communication device 110 enables the data transfer of the application to switch from the first data connection to the second data connection.

In step S510, the connection management program in the mobile communication device 110 sets the first subscriber number to the idle state and the second subscriber number to the active state.

It should be understood that the flow chart described in the embodiment of FIGS. 5A~5B is for illustrative purposes only and is not intended to limit the scope of the application. For example, subsequent to step S510, the method may return to step S506 to keep monitoring the QoS of the first data connection and the second data connection.

FIG. 6 is a flow chart illustrating the switching of data connections used for the data transfer of a delay-critical application according to an embodiment of the application.

In this embodiment, the service type of the application relates to URLLC.

In step S601, the application uses the first data connection established with the first subscriber number for data transfer. At this time, the first subscriber number is set to the active state while the second subscriber number is set to the idle state.

In step S602, the connection management program receives a QoS update notification from one of the wireless transceivers, which indicates that the QoS parameter (e.g., at least one of the 5G QoS Identifier (5QI), Packet Delay Budget (PDB), and Packet Error Rate (PER)) of the first data connection fails to satisfy the performance requirement corresponding to the service type of the application. That is, the QoS of the first data connection fails to support the application.

For example, according to the 3rd Generation Partnership Project (3GPP) Technical Specification (TS) 23.501, if the service type of the application is discrete automation, the corresponding performance requirement may include: 5QI=82, PDB=10 ms, and/or PER=$10^{-4}$; if the service type of the application is Intelligent Transport System (ITS), the corresponding performance requirement may include: 5QI=84, PDB=30 ms, and/or PER=$10^{-5}$; if the service type of the application is Vehicle-to-Everything (V2X), the corresponding performance requirement may include: 5QI=85~86, PDB=5 ms, and/or PER=$10^{-5}$~$10^{-4}$.

In step S603, the connection management program determines that the QoS parameter (e.g., at least one of the 5QI, PDB, and PER) of the second data connection satisfies the performance requirement corresponding to the service type of the application.

For example, the QoS parameter of the second data connection may be received from one of the wireless transceivers in a most recent update of the QoS parameter.

In step S604, the connection management program notifies the application of that the QoS parameter of the first data connection fails to satisfy the performance requirement of the application and the QoS parameter of the second data connection satisfies the performance requirement of the application, so as to enable the application to switch the data transfer from the first data connection to the second data connection.

In step S605, the application switches the data transfer from the first data connection to the second data connection. Specifically, the application was using the service session over the first data connection for data transfer in the first place. Therefore, the application may first release the service session over the first data connection, and then start a new service session over the second data connection to continue the data transfer.

In step S606, the connection management program sets the first subscriber number to the idle state and the second subscriber number to the active state, and keeps monitoring the QoS of the first and second data connections associated with the first and second subscriber numbers.

FIG. 7 is a flow chart illustrating the switching of data connections used for the data transfer of a Guaranteed Flow Bit Rate (GFBR) application according to an embodiment of the application.

In this embodiment, the service type of the application relates to eMBB.

In step S701, the application uses the first data connection established with the first subscriber number for data transfer. At this time, the first subscriber number is set to the active state while the second subscriber number is set to the idle state.

In step S702, the connection management program receives a QoS update notification from one of the wireless transceivers, which indicates that the QoS parameter (e.g., at least one of the 5QI, PDB, and GFBR) of the first data connection fails to satisfy the performance requirement corresponding to the service type of the application. That is, the QoS of the first data connection fails to support the application.

For example, according to the 3GPP TS 23.501, if the service type of the application is live streaming, the corresponding performance requirement may include: 5QI=2, PDB=150 ms, and/or GFBR=20 Mbps; if the service type of the application is Real Time AR/VR Gaming, the corresponding performance requirement may include: 5QI=3, PDB=50 ms, and/or GFBR=150 Mbps.

In step S703, the connection management program determines that the QoS parameter (e.g., at least one of the 5QI, PDB, and GFBR) of the second data connection satisfies the performance requirement corresponding to the service type of the application.

For example, the QoS parameter of the second data connection may be received from one of the wireless transceivers in a most recent update of the QoS parameter.

In step S704, the connection management program notifies the application of that the QoS parameter of the first data connection fails to satisfy the performance requirement of the application and the QoS parameter of the second data connection satisfies the performance requirement of the application, so as to enable the application to switch the data transfer from the first data connection to the second data connection.

In step S705, the application switches the data transfer from the first data connection to the second data connection. Specifically, the application was using the service session over the first data connection for data transfer in the first place. Therefore, the application may first release the service session over the first data connection, and then start a new service session over the second data connection to continue the data transfer.

In step S706, the connection management program sets the first subscriber number to the idle state and the second subscriber number to the active state, and keeps monitoring the QoS of the first and second data connections associated with the first and second subscriber numbers.

In view of the forgoing embodiments, it will be appreciated that the present application realizes automatic switching between a plurality of connections in a multi-card cellular phone which supports network slicing. Specifically, the multi-card cellular phone is enabled to monitor the QoS of the data connections associated with different subscriber numbers, and to switch the data transfer of an application from one data connection to another when the QoS of the currently used data connection fails to satisfy the performance requirement of the application. Advantageously, the methods of the present application may significantly improve user experiences during the process of connection switching in multi-card cellular phones.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
one or more wireless transceivers, configured to perform wireless transmission and reception using a mobile communication technology; and
a controller, configured to perform multi-number connection management, wherein the multi-number connection management comprises:
using a first subscriber number and a second subscriber number to establish a first data connection with a first mobile communication network and a second data connection with a second mobile communication network, respectively, via the wireless transceiver;
receiving a Quality of Service (QoS) update notification from one of the wireless transceivers when the first data connection is used for data transfer of an application; and
enabling the data transfer of the application to switch from the first data connection to the second data connection in response to the QoS update notification indicating that a QoS of the first data connection fails to support the application and a QoS of the second data connection is capable of supporting the application;
wherein the multi-number connection management is executed in an application framework layer, and the application is executed in an application layer on top of the application framework layer.

2. The mobile communication device of claim 1, wherein the QoS update notification comprises at least one of the following:
a 5G QoS Identifier (5QI) of the first data connection;
a Packet Delay Budget (PDB) of the first data connection;
a Packet Error Rate (PER) of the first data connection; and
a Guaranteed Flow Bit Rate (GFBR) of the first data connection.

3. The mobile communication device of claim 2, wherein the multi-number connection management further comprises:
determining that the QoS of the first data connection fails to support the application in response to a service type of the application being associated with Ultra-Reliable Low-Latency Communication (URLLC) and at least one of the 5QI, the PDB, and the PER of the first data connection failing to satisfy a performance requirement corresponding to the service type of the application; and
determining that the QoS of the first data connection fails to support the application in response to the service type of the application being associated with enhanced Mobile Broadband (eMBB) and at least one of the 5QI, the PDB, and the GFBR of the first data connection failing to satisfy the performance requirement corresponding to the service type of the application.

4. The mobile communication device of claim 1, wherein the multi-number connection management further comprises:
determining that the QoS of the second data connection is capable of supporting the application in response to a service type of the application being associated with URLLC and at least one of a 5QI, a PDB, and a PER of the second data connection satisfying a performance requirement corresponding to the service type of the application; and
determining that the QoS of the second data connection is capable of supporting the application in response to the service type of the application being associated with eMBB and at least one of the 5QI, the PDB, and a GFBR of the second data connection satisfying the performance requirement corresponding to the service type of the application.

5. The mobile communication device of claim 1, wherein the multi-number connection management further comprises:
  notifying the application of that the QoS of the first data connection fails to support the application and the QoS of the second data connection is capable of supporting the application, so as to enable the application to switch the data transfer from the first data connection to the second data connection; and
  setting the first subscriber number to an idle state and the second subscriber number to an active state in response to the application switching the data transfer from the first data connection to the second data connection.

6. A method for managing connections associated with multiple subscriber numbers, executed by a mobile communication device comprising one or more wireless transceivers, the method comprising:
  using a first subscriber number and a second subscriber number to establish a first data connection with a first mobile communication network and a second data connection with a second mobile communication network, respectively;
  receiving a QoS update notification from one of the wireless transceivers when the first data connection is used for data transfer of an application; and
  enabling the data transfer of the application to switch from the first data connection to the second data connection in response to the QoS update notification indicating that a QoS of the first data connection fails to support the application and a QoS of the second data connection is capable of supporting the application,
  wherein the method is executed in an application framework layer of the mobile communication device, and the application is executed in an application layer on top of the application framework layer.

7. The method of claim 6, wherein the QoS update notification comprises at least one of the following:
  a 5G QoS Identifier (5QI) of the first data connection;
  a Packet Delay Budget (PDB) of the first data connection;
  a Packet Error Rate (PER) of the first data connection; and
  a Guaranteed Flow Bit Rate (GFBR) of the first data connection.

8. The method of claim 7, further comprising:
  determining that the QoS of the first data connection fails to support the application in response to a service type of the application being associated with Ultra-Reliable Low-Latency Communication (URLLC) and at least one of the 5QI, the PDB, and the PER of the first data connection failing to satisfy a performance requirement corresponding to the service type of the application; and
  determining that the QoS of the first data connection fails to support the application in response to the service type of the application being associated with enhanced Mobile Broadband (eMBB) and at least one of the 5QI, the PDB, and the GFBR of the first data connection failing to satisfy the performance requirement corresponding to the service type of the application.

9. The method of claim 6, further comprising:
  determining that the QoS of the second data connection is capable of supporting the application in response to a service type of the application being associated with URLLC and at least one of a 5QI, a PDB, and a PER of the second data connection satisfying a performance requirement corresponding to the service type of the application; and
  determining that the QoS of the second data connection is capable of supporting the application in response to the service type of the application being associated with eMBB and at least one of the 5QI, the PDB, and a GFBR of the second data connection satisfying the performance requirement corresponding to the service type of the application.

10. The method of claim 6, further comprising:
  notifying the application of that the QoS of the first data connection fails to support the application and the QoS of the second data connection is capable of supporting the application, so as to enable the application to switch the data transfer from the first data connection to the second data connection; and
  setting the first subscriber number to an idle state and the second subscriber number to an active state in response to the application switching the data transfer from the first data connection to the second data connection.

11. A mobile communication device, comprising:
  one or more wireless transceivers, configured to perform wireless transmission and reception using a mobile communication technology; and
  a controller, configured to perform multi-number connection management, wherein the multi-number connection management comprises:
  using a first subscriber number and a second subscriber number to establish a first data connection with a first mobile communication network and a second data connection with a second mobile communication network, respectively, via the wireless transceiver;
  receiving a Quality of Service (QoS) update notification from one of the wireless transceivers when the first data connection is used for data transfer of an application; and
  enabling the data transfer of the application to switch from the first data connection to the second data connection in response to the QoS update notification indicating that a QoS of the first data connection fails to support the application and a QoS of the second data connection is capable of supporting the application;
  wherein the QoS update notification indicates that the QoS of the second data connection is capable of supporting the application when one of the following condition is met:
  a service type of the application is associated with URLLC, and the QoS update notification indicates that at least one of a 5QI, a PDB, and a PER of the second data connection satisfies a performance requirement corresponding to the service type of the application; and
  the service type of the application is associated with eMBB, and the QoS update notification indicates that at least one of the 5QI, the PDB, and a GFBR of the second data connection satisfies the performance requirement corresponding to the service type of the application.

12. A method for managing connections associated with multiple subscriber numbers, executed by a mobile communication device comprising one or more wireless transceivers, the method comprising:
  using a first subscriber number and a second subscriber number to establish a first data connection with a first mobile communication network and a second data connection with a second mobile communication network, respectively;

receiving a QoS update notification from one of the wireless transceivers when the first data connection is used for data transfer of an application; and enabling the data transfer of the application to switch from the first data connection to the second data connection in response to the QoS update notification indicating that a QoS of the first data connection fails to support the application and a QoS of the second data connection is capable of supporting the application;

wherein the QoS update notification indicates that the QoS of the second data connection is capable of supporting the application when one of the following condition is met:

a service type of the application is associated with URLLC, and the QoS update notification indicates that at least one of a 5QI, a PDB, and a PER of the second data connection satisfies a performance requirement corresponding to the service type of the application; and the service type of the application is associated with eMBB, and the QoS update notification indicates that at least one of the 5QI, the PDB, and a GFBR of the second data connection satisfies the performance requirement corresponding to the service type of the application.

* * * * *